(12) United States Patent
Adams

(10) Patent No.: US 10,564,181 B2
(45) Date of Patent: Feb. 18, 2020

(54) ATOMIC FORCE MICROSCOPE WITH OPTICAL GUIDING MECHANISM

(71) Applicant: Nanosurf AG, Liestal (CH)

(72) Inventor: Jonathan Adams, Basel (CH)

(73) Assignee: Nanosurf AG, Liestal (CH)

( * ) Notice: Subject to any disclaimer, the term of this patent is extended or adjusted under 35 U.S.C. 154(b) by 0 days.

(21) Appl. No.: 16/113,192

(22) Filed: Aug. 27, 2018

(65) Prior Publication Data

US 2019/0064208 A1 Feb. 28, 2019

(30) Foreign Application Priority Data

Aug. 31, 2017 (CH) ...................................... 1094/17

(51) Int. Cl.
*G01Q 20/02* (2010.01)
*G01Q 60/24* (2010.01)
*G01Q 10/00* (2010.01)

(52) U.S. Cl.
CPC .............. *G01Q 20/02* (2013.01); *G01Q 10/00* (2013.01); *G01Q 60/24* (2013.01)

(58) Field of Classification Search
CPC ......... G01Q 20/02; G01Q 60/24; G01Q 10/00
USPC .......................................................... 850/5–7
See application file for complete search history.

(56) References Cited

U.S. PATENT DOCUMENTS 5,408,094 A * 4/1995 Kajimura ............... B82Y 35/00
250/234
5,463,897 A 11/1995 Prater et al.
6,877,365 B2 * 4/2005 Watanabe .............. B82Y 35/00
73/105
7,249,494 B2 * 7/2007 Hwang .................. B82Y 35/00
73/105
2009/0184242 A1 * 7/2009 Howald ................. G01Q 20/02
250/306

(Continued)

FOREIGN PATENT DOCUMENTS

JP 10300760 A 11/1998
WO 2014057268 A1 4/2014

OTHER PUBLICATIONS

Binnig et al., "Atomic Force Microscope," Physical Review Letters, 1986, pp. 930-933, vol. 56:9.

(Continued)

*Primary Examiner* — Michael Maskell
(74) *Attorney, Agent, or Firm* — The Webb Law Firm

(57) ABSTRACT

An atomic force microscope includes a scanner for scanning a probe along at least one translational axis, a stationary light source for generating an incident light beam, a stationary position sensitive detector for detecting a light beam reflected from a cantilever, an optical guiding mechanism for compensating a scanning motion of the probe and configured to guide the incident light beam to a spot on the cantilever and to guide the reflected light beam from the cantilever to the position sensitive detector, wherein the optical guiding mechanism includes at least two optical deflection elements per translational axis arranged to move synchronously with the probe along the respective translational axis, and configured to define an optical path between the light source and the detector for the incident and reflected light beam such that the optical path length is independent of the translation of the probe along the respective translational axis.

17 Claims, 11 Drawing Sheets

(56) References Cited

U.S. PATENT DOCUMENTS

2015/0219686 A1* 8/2015 Humphris .............. B82Y 35/00
 850/6
2015/0285836 A1 10/2015 Humphris et al.

OTHER PUBLICATIONS

Nakano, "Three-Dimensional beam tracking for optical lever detection in atomic force microscopy," Review of Scientific Instruments, 2000, pp. 137-141, vol. 71:1.

* cited by examiner

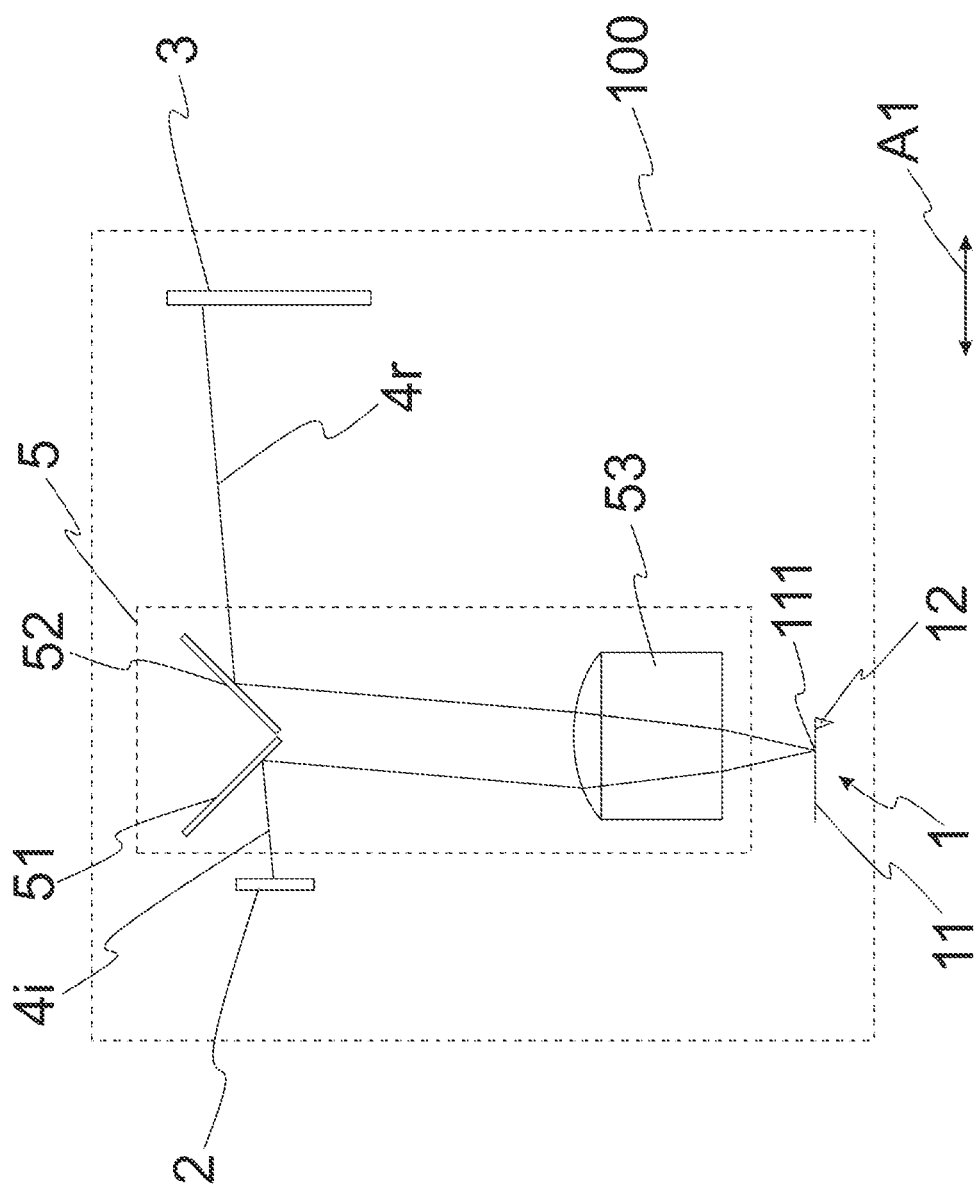

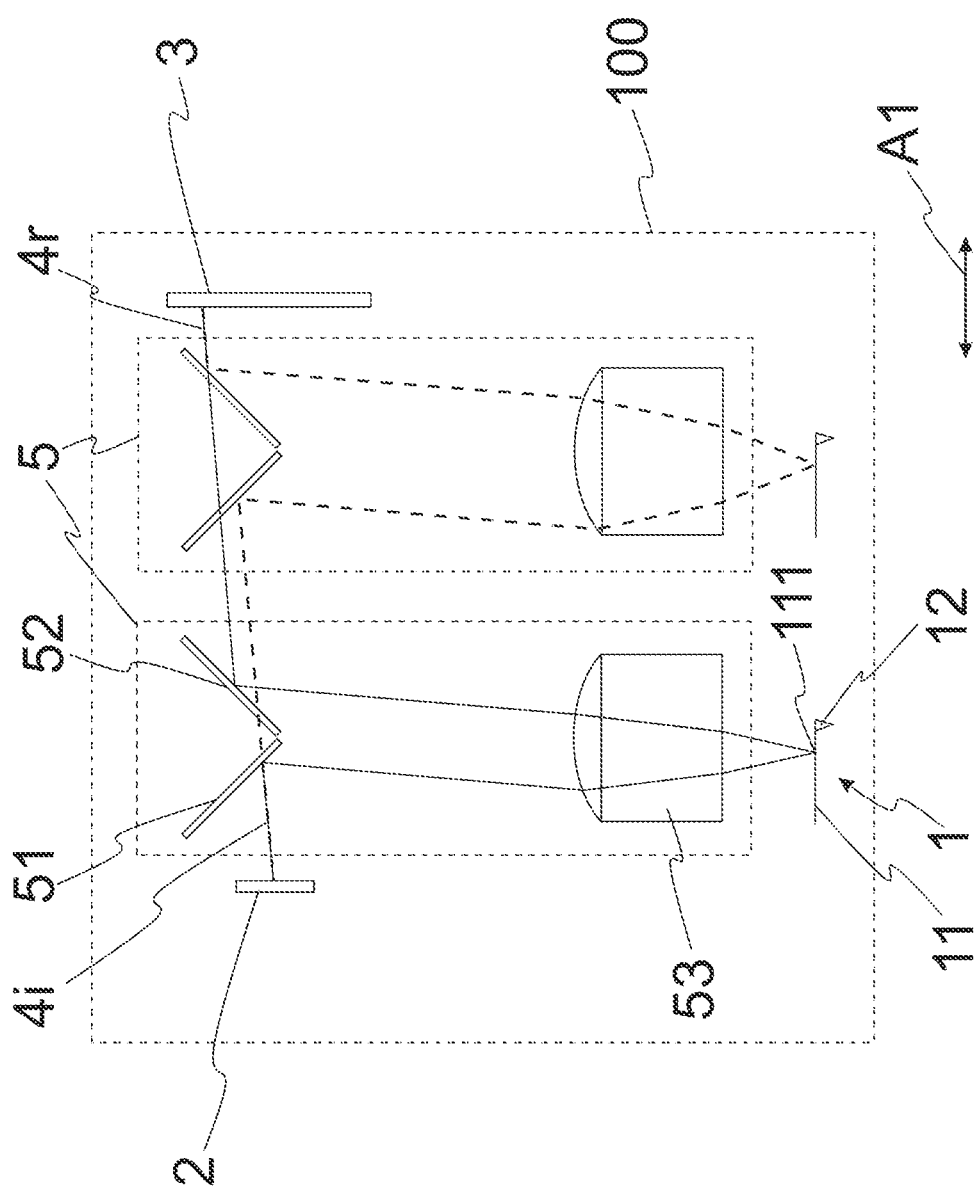

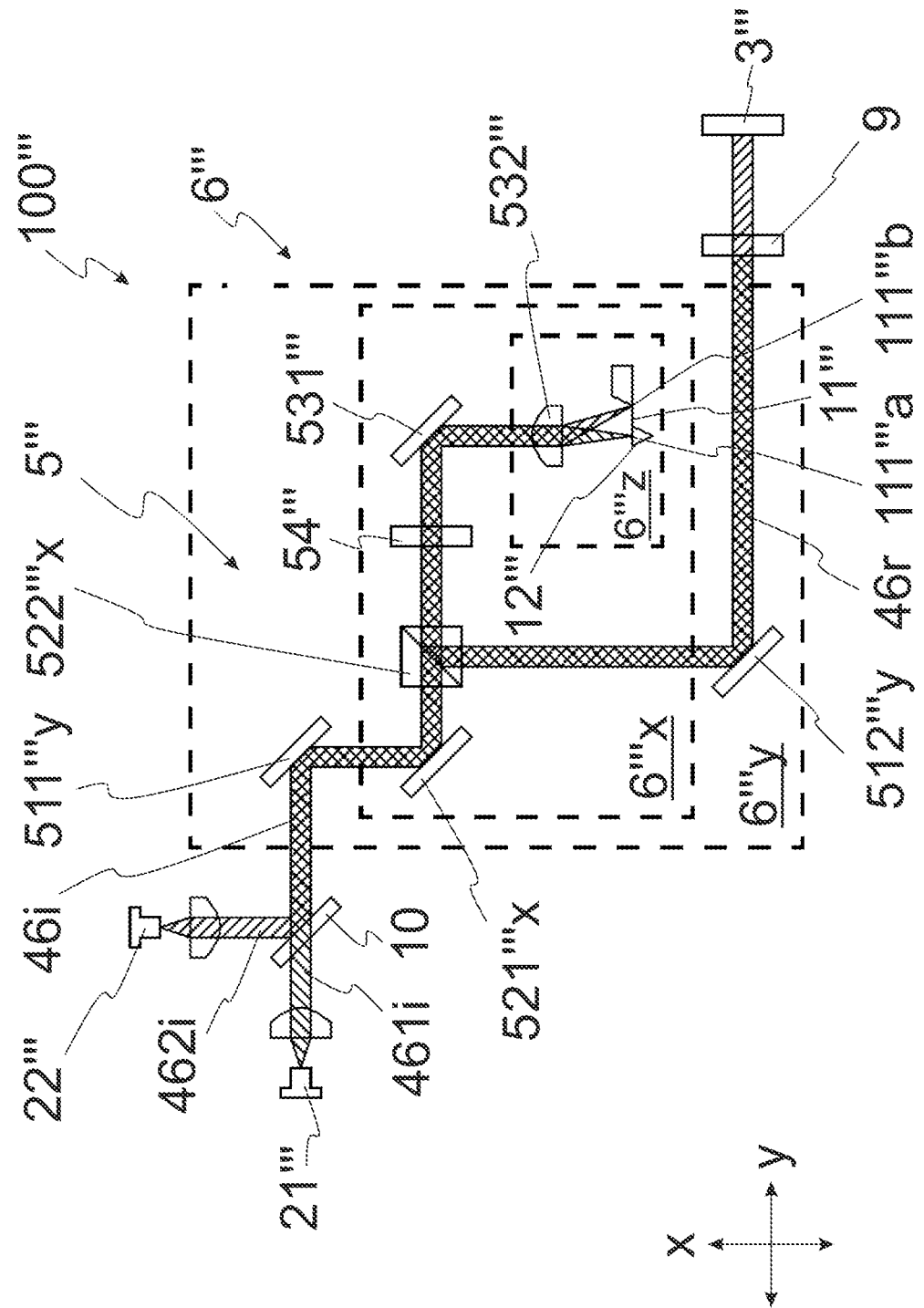

ATOMIC FORCE MICROSCOPE WITH OPTICAL GUIDING MECHANISM

CROSS-REFERENCE TO RELATED APPLICATION

This application claims priority to Swiss Patent Application No. 01094/17 filed Aug. 31, 2017, the disclosure of which is hereby incorporated by reference in its entirety.

BACKGROUND OF THE INVENTION

Field of the Invention

The present invention relates to an atomic force microscope with an optical guiding mechanism, an optical guiding mechanism for an atomic force microscope, and a method for operating an atomic force microscope with an optical guiding mechanism.

RELATED ART

The atomic force microscope (G. Binnig, C. F. Quate and Ch. Gerber, Phys. Rev. Lett. 56, 930, 1986) as a type of a scanning probe microscope (SPM) represents a highly versatile microscopy tool for nanoscale characterization and manipulation. Employing a probe comprising a cantilever with a very sharp tip arranged at a free end of the cantilever, topographic images of a surface with a resolution down to the nanometer or even sub-nanometer range can be achieved. In order to obtain a topographic image of a surface of a sample, the tip of the probe is brought in close proximity to or in contact with the surface while relatively scanning the probe and the sample in the horizontal (X-Y) plane. Depending on the interaction between the tip and the surface, the free end of the cantilever is deflected, providing a measure for the forces arising between the tip and the surface.

An atomic force microscope (AFM) can be operated in various modes for obtaining a topographic image, such as contact (or static) mode and oscillating (or dynamic) modes. In contact mode, the tip is in mechanical contact with the surface of the sample while scanning the sample and the topography is measured by the deflection of the cantilever or by a feedback signal, such as the interaction force in constant-force mode. In the oscillating mode, the change on the amplitude, phase and/or frequency of the oscillating cantilever due to sample-tip interaction is used as a feedback signal for determining the topography while scanning the sample surface.

The deflection of the cantilever of an AFM can be detected by various methods such as capacitive detection, piezoresistive detection, piezoelectric detection or by an optical lever arrangement. Due to its simplicity of implementation and high sensitivity, the deflection of the cantilever is typically measured by an optical lever arrangement, where a laser beam focused on a spot on the cantilever is reflected from the cantilever and detected by a position sensitive (photo)detector (PSD). A deflection of the cantilever thus translates into a displacement of the reflected laser beam, which can be detected by the PSD.

Relative scanning of the probe and the sample in the horizontal plane is in general achieved by two main scanning configurations, the "probe-scanning" configuration and the "sample-scanning" configuration. In the "sample-scanning" configuration, the probe with the tip is kept stationary and the sample is moved while being scanned. The movement of sample can be achieved by a piezoelectric scanner arranged underneath and connected to the sample. However, due to the size and mass of the sample affecting the performance of the piezoelectric scanner, the "sample-scanning" configuration puts limits on the eligible samples for scanning. In addition, scanning moving samples, such as some biological samples in liquids, is difficult or impossible using the "sample-scanning" configuration.

In order to circumvent said limitations, the "probe-scanning" configuration is often preferred, where the probe with the tip is moved over a stationary sample while scanning. Typically, a tube scanner is used with the probe being mounted on a piezoelectric tube actuator. Using the "probe-scanning" configuration sets requirements on the optical lever arrangement for detecting the deflection of the cantilever. In particular, it is required to keep the laser beam on the same spot on the cantilever while scanning the probe over the sample surface, such that detection of false deflections, in particular due to the scanning motion, can be minimized. First approaches to keep the beam on a spot on the cantilever relied on using simply a large cantilever or to mount the complete optical system including the laser source and the PSD on the scanner moving with the probe which, however, leads to a large mass to move with the scanner, thus limiting the performance. Various other approaches have been proposed to fulfill this requirement and to achieve a so-called beam tracking or cantilever tracking method.

An optical lever system with cantilever tracking for an AFM is for example described in U.S. Pat. No. 5,463,897, where the AFM includes a scanning mechanism comprising a piezoelectric tube scanner, a fixed light source, a cantilever attached to the scanning mechanism, a stylus mounted on the cantilever and an optical assembly mounted on the scanning mechanism which comprises a steering lens that guides a light beam emitted from the light source onto a point on the cantilever during movement of the scanning mechanism. A position detector receives a light beam reflected from the cantilever and detects a deflection of the cantilever. The optical assembly will move with the scanning mechanism and guide the light beam to a spot on the cantilever while it is scanned across the sample, to avoid both scanning the cantilever out from under a fixed, unguided beam and movement of the beam spot on the cantilever. In particular, the position detector is located at a point where all light beams reflected from a cantilever with a fixed bend during a full extent of its movement converge.

A beam tracking system for an AFM is described in U.S. Pat. No. 7,249,494 B2, the beam tracking system comprising a base to carry a sample to be scanned; a cantilevered probe to scan said sample in order to obtain topographic information representing a surface of said sample and a laser source to generate a laser beam. The beam tracking system further comprises an optical module to align and introduce said laser beam to said probe; a feedback module, comprising a photo sensing device, to receive said laser beam reflected from said probe and to introduce said reflected laser beam to said photo sensing device; a probe driving device to drive said probe to scan three-dimensionally; an approach mechanism to drive said probe and to adjust the relative position of said probe and said sample; and an information processing module to pick up signals contained in said reflected laser beam as sensed by said photo sensing device and to convert said information into topographic information representing the surface of said sample. The optical module comprises an objective lens to focus the laser beam and the probe is located approximately at the focal point of said objective lens. The laser source, the optical module, the feedback module and the probe are driven by the approach mechanism to move in synchronization. The vertical scanning of the probe is driven by a vertical tube scanner and a piezoelectric oscillator, and the horizontal scanner is supported to control the movement of the horizontal scanner with the help of flexure guiding devices.

SUMMARY OF THE INVENTION

While the use of AFMs enabled substantial advances in various fields ranging from semiconductor nanotechnology to biotechnological applications, the requirements on commercial AFMs have increased continuously, in particular with respect to increased speed and increased precision. These requirements are typically addressed with developing on hardware such as for example improved positioners, cantilevers and tips, detectors or on improving the control systems. In this context, approaches to minimize the detection of false deflections play an important role for increasing the performance of AFMs.

It is therefore an object of the invention to provide an atomic force microscope with an optical guiding mechanism, an optical guiding mechanism for an atomic force microscope, and a method for operating an atomic force microscope with an optical guiding mechanism, which at least partially improve the prior art and avoid at least part of the mentioned disadvantages of the prior art.

According to the present invention, this object is achieved by the features of the independent claims. In addition, further advantageous embodiments follow from the dependent claims and the description as well as the figures.

According to an aspect of the invention, the object is particularly achieved by an atomic force microscope for scanning a probe comprising a cantilever over a surface, the atomic force microscope comprising a scanner for scanning the probe along at least one translational axis, a stationary light source for generating an incident light beam, a stationary position sensitive detector for detecting a light beam reflected from the cantilever, and an optical guiding mechanism for compensating a scanning motion of the probe and configured to guide the incident light beam to a spot on the cantilever and to guide the reflected light beam from the cantilever to the position sensitive detector. The optical guiding mechanism comprises at least two optical deflection elements per translational axis being arranged to move synchronously with the probe along the respective translational axis, and being configured to define an optical path between the light source and the detector for the incident and reflected light beam in a manner that the optical path length is independent of the translation of the probe along the respective translational axis.

The atomic force microscope usually comprises a probe with a tip which is preferably arranged at a free end of the cantilever. Typically, different probes for different purposes, for example with different shapes of the tip or different mechanical properties of the cantilever, are used, depending on the sample to be scanned and the properties of the sample to be investigated. Preferably, the atomic force microscope therefore comprises a probe which is exchangeable. The scanner usually comprises a stationary support and at least one movable positioning unit for scanning the probe, which is designed to move with respect to the stationary support while scanning. The movable positioning unit may comprise at least one piezoelectric actuator. The scanner may comprise a piezoelectric tube positioner with a sectored tube-shaped piezoelectric actuator and/or a planar flexure-guided positioner with the positioning unit connected to the support by flexures and driven by at least one piezoelectric actuator for each translational axis. Other actuators known to the person skilled in the art, such as for example electromagnetic actuators, may be used alternatively or additionally. The probe may be connected to the positioning unit by means of a probe holder.

The optical deflection elements may be constructed as separate optical elements such as for example mirrors, prisms or beam splitters. However, the separate optical elements may be attached to each other or may be integrally formed to form a single optical device. In a variant, the optical deflection elements may be constructed as different reflecting faces of a single optical device.

In the context of this invention, independency of an optical path length (in terms of an optical path length being constant) with respect to a translation or maintaining the spot of an impinging light beam is understood to be valid within the range of tolerances and deviations, respectively, familiar to the person skilled in the art, such as for example deviations due to non-idealities of the optical deflection elements or focusing optics, or deviations of the optical path of the light beam from ideal ray optics. Further, translation of the probe along a translational axis does not exclude the trajectory of the probe or the tip, respectively, to exhibit certain curvatures as it is for example the case for tube scanners.

Preferably, the at least two optical deflection elements per translational axis are arranged on the scanner to move synchronously with the probe along the respective translational axis. However, the at least two optical deflection elements per translational axis may be arranged off the scanner, but in an arrangement to move synchronously with the probe and the scanner, respectively.

Providing a stationary light source and a stationary position sensitive detector which do not move with the scanner has the advantage that the mass that has to be moved can be reduced, thereby increasing the performance of the AFM. The optical guiding mechanism is preferably configured to guide the light beam from the light source, preferably a laser source, to a spot on the cantilever, where the light beam is reflected, and to guide the reflected light beam to the position sensitive detector, such that an optical lever arrangement for detecting deflection of the cantilever can be achieved. The optical guiding mechanism may comprise optical elements such as lenses, mirrors, prisms, filters, beam splitters, wave plates, polarizers etc. Usually, the optical guiding mechanism comprises a focusing optics arranged before the cantilever in order to focus the incident laser beam to the spot on the cantilever.

The at least two optical deflection elements per translational axis preferably comprise a first optical deflection element arranged in the optical path of the light beam before impinging on the cantilever and a second optical deflection element arranged in the optical path of the light beam after being reflected from the cantilever.

In particular, the at least two optical deflection elements may be arranged such that one of the optical deflection elements may be arranged at an expanding segment of the optical path and another of the optical deflection elements may be arranged at a contracting segment of the optical path upon movement of the probe along a respective translational axis.

The at least two optical deflection elements of the optical guiding mechanism assigned to a respective translational axis and arranged to move synchronously with the probe along said axis provide the advantage that the spot on the cantilever where the incident light beam impinges can be maintained independent of a translation of the probe along said axis. In particular, the at least two optical deflection elements per translational axis are configured to compensate the translation of the probe along said axis. Further, said optical deflection elements defining the optical path with an optical path length being independent of the translation of the probe along said axis provide the advantage that the spot on the PSD where the reflected light beam impinges can be maintained independent of the translation of the probe along said axis. The optical deflection elements of the optical guiding mechanism moving synchronously with the probe therefore provide the advantage of a compensation of the motion of the probe associated with scanning the probe along at least one translational axis in a manner that deflections detected by the PSD can substantially be related to deflections of the cantilever due to the topography of the scanned sample only. Therefore, detection of false deflections arising from the motion of the probe associated with scanning the probe can advantageously be reduced or avoided.

The AFM with the optical guiding mechanism provides the advantage of a versatile scanner motion compensation mechanism, where the motion of the probe along an arbitrary translational axis can independently be compensated by the use of the optical deflection elements associated with the respective translational axis.

In some embodiments, the stationary light source and the stationary position sensitive detector are arranged on opposite sides with respect to the optical guiding mechanism.

Arranging the stationary light source and the stationary PSD on opposite sides with respect to the optical guiding mechanism provides the advantage that an optical path with an optical path length being independent on translation of the probe along a translational axis can be achieved in an efficient manner by optical deflection elements being arranged in the optical path between the stationary light source and the stationary PSD and being synchronously movable with the probe. In the context of this invention, the stationary light source and the stationary PSD being arranged on opposite sides with respect to the optical guiding mechanism is understood as the incident light beam generated by the stationary light source and the reflected light beam detected by the PSD to enter and to leave the optical guiding mechanism on opposite sides, respectively. Before and after the optical guiding mechanism, optional optical elements may be arranged to guide the respective light beam in other directions.

In some embodiments, the stationary light source and the stationary position sensitive detector are arranged on opposite sides with respect to the scanner.

Preferably, the stationary light source is configured to generate a light beam which is substantially parallel to a translational axis. Further, the at least two optical deflection elements per translational axis are preferably configured to guide the light beam in manner that the light beam propagates substantially parallel to one of the at least one translational axis. However, the optical guiding mechanism configured to keep the optical path length independent of translation of the probe along a translational axis provides the advantage that large false deflections occurring with translation of the probe due to deviations of the light beam from the ideal parallel configuration, for example due to tilting the incident light beam for focus positioning, can be avoided or reduced. Instead, tilting the incident light beam may lead to a certain displacement of the spot on the PSD where the reflected light beam impinges, which, however, is advantageously unaltered by translation of the probe along a translational axis. In some embodiments, the at least two optical deflection elements are configured to guide incident and reflected light beams such that the incident and reflected light beams are parallel to each other along at least a part of the optical path.

For the at least two optical deflection elements per translational axis comprising a first optical deflection element arranged in the optical path of the light beam before impinging on the cantilever and a second optical deflection element arranged in the optical path of the light beam after being reflected from the cantilever, the incident light beam in the optical path before the first optical deflection element and the reflected light beam in the optical path after the second optical deflection element are preferably guided parallel to each other by the first and second optical deflection element, respectively. Preferably, the light beams in the optical path after the first optical deflection element and in the optical path before the second optical deflection element are guided parallel to each other. However, focusing optics for focusing the light beam onto a spot on the cantilever can cause a deviation from the parallel orientation for at least a part of the optical path.

In some embodiments, the scanner is configured to scan the probe along a first and a second horizontal translational axis, wherein the optical guiding mechanism comprises at least four optical deflection elements, wherein for each of the first and second horizontal translational axis at least two optical deflection elements are arranged to move synchronously with the probe along the respective axis.

The first and second horizontal translational axes are preferably perpendicular to each other. The configuration with at least four optical deflection elements with at least two optical deflection elements per horizontal translational axis each provides the advantage that the motion of the probe along each horizontal translational axis can each be compensated. In combination, an arbitrary translation of the probe in the horizontal plane spanned by the first and second horizontal translational axes can be compensated. Thus, detection of false deflections due to horizontal motion of the probe can advantageously be reduced or avoided. In some embodiments, the at least two optical deflection elements associated with the first horizontal translational axis and the at least two optical deflection elements associated with the second horizontal translational axis are arranged in a nested manner, such that the light beam may propagate from optical deflection elements associated with one of the horizontal axis to optical deflection elements associated to the other horizontal axis. In particular, the optical deflection elements may be arranged such that the light beam propagates in the following sequence: light source→a first optical deflection element associated with the first horizontal translational axis→a first optical deflection element associated with the second horizontal translational axis→the cantilever→a second optical deflection element associated with the second horizontal translational axis→a second optical deflection element associated with the first horizontal translational axis→PSD. Within the sequence, further optical elements, such as for example redirecting and/or focusing optics before/after the cantilever, may be arranged. In some embodiments, the scanner is configured to scan the probe along a vertical axis, wherein the optical guiding mechanism comprises at least two optical deflection elements which are arranged on the scanner to move with the probe along said vertical axis.

In particular, the optical deflection elements may be configured to define an optical path between the light source and the detector in a manner that the optical path length is independent of the translation of the probe along said vertical axis. This provides the advantage that a motion of the probe associated with scanning in vertical direction can be compensated, i.e. false deflections associated therewith can be reduced or avoided.

In combination with the optical deflection elements configured to compensate the motion of the probe in a horizontal plane, a three-dimensional compensation mechanism for the motion of the probe associated with scanning can be achieved.

The optical deflection elements may be reflective elements, for example comprising at least one of mirrors, especially tip-tilt mirrors, or prisms or polarizing beam splitters.

In particular, the tip-tilt mirrors may be used to adjust incident and reflected light beams to propagate parallel to each other.

In some embodiments, the optical deflection elements for compensating the translation of the probe may be configured to guide the light beam to propagate in a plane parallel to a plane of the scanner along at least a part of the optical path.

In a variant, the optical deflection elements for compensating the translation of the probe are arranged in a common plane parallel to a plane of the scanner. Additional optical elements may be arranged in the optical path for guiding the light beam out of said plane onto the cantilever and the light beam reflected from the cantilever back into said plane. In this way, the compensation of the horizontal motion of the probe can be achieved by keeping the optical path length in said plane independent of the horizontal scanning motion of the probe.

In some embodiments, the scanner comprises a planar flexure-guided positioner for scanning the probe.

Typically, a planar flexure-guided positioner comprises at least one movable positioning unit for at least one translational axis, which is connected to a support by flexures and driven by at least one piezoelectric actuator. The planar flexure-guided positioner provides the advantage of high-speed scanning with low cross-coupling between the translational axes while ensuring high accuracy in positioning. The guiding mechanism according to the present invention is particularly advantageous for scanning motion compensation for planar flexure-guided positioners, since the optical deflection elements for compensating the motion of the probe along a translational axis define the optical path length to be independent or to not rely, respectively, on possible curvatures involved in the trajectory of the probe while scanning.

In some embodiments, the planar flexure-guided positioner comprises a first positioning unit for scanning along an X-axis and a second positioning unit for scanning along a Y-axis perpendicular to the X-axis, wherein the positioning units are arranged in a serial-connected fashion.

For these embodiments, at least two optical deflection elements are arranged on the first positioning unit (X-axis positioning unit) to move therewith and at least two optical deflection elements are arranged on the second positioning unit (Y-axis positioning unit) to move therewith. Preferably, a first and a second optical deflection element, are arranged on the X-axis positioning unit and a first and a second optical deflection element are arranged on the Y-axis positioning unit which is nested within the X-axis positioning unit. On the Y-axis positioning unit there may be arranged additional optical elements for guiding the light beam out of the plane of the flexure-guided positioner onto the cantilever and from the cantilever back into the plane of the flexure-guided positioner. The optical deflection elements may be arranged such that the light beam propagates in the following sequence: light source→first optical deflection element on the X-axis positioning unit→first optical deflection element on the Y-axis positioning unit→cantilever→second optical deflection element on the Y-axis positioning unit→second optical deflection element on the X-axis positioning unit→PSD. The role of the X-axis and the Y-axis may be interchanged without changing the technical effect. Within the sequence, the additional optical elements, such as redirecting and/or focusing optics for guiding the light beam onto/from the cantilever may be arranged before/after the cantilever.

In some embodiments, a first and second positioning unit for scanning along an X-axis and a Y-axis, respectively, are arranged in a parallel configuration. The optical deflection elements of the optical guiding mechanism may be arranged off the scanner, for example on a separate stage, but in a manner to move synchronously with the probe. In particular, the optical deflection elements associated with the X-axis and the optical deflection elements associated with the Y-axis may be arranged in a nested manner while the positioning units may be arranged in a parallel configuration.

In some embodiments, the atomic force microscope comprises at least two independent stationary light sources for generating at least two independent incident light beams, wherein the optical guiding mechanism is configured to guide each incident light beam to a spot on the cantilever, wherein the optical deflection elements of the optical guiding mechanism are configured define an optical path for each incident and reflected light beam between the light source and the detector in a manner that each optical path length is independent of the translation of the probe along the respective translational axis.

The AFM with the guiding mechanism therefore provides the advantage that a scanning motion compensation for multiple independent light beams for tracking the cantilever deflection can be enabled using the same guiding mechanism. The different light beams can be used for different additional purposes, for example tracking torsional motion of the cantilever, tracking different positions along the cantilever, photothermal excitation, guiding a light beam to the sample to be scanned in close vicinity of the tip, combination of optical beam deflection and interferometric deflection etc.

In some embodiments, the AFM comprises a separate optical guiding mechanism for each independent light source.

In particular, one of the independent stationary light sources may be a photothermal laser source for photothermal excitation of the cantilever.

Photothermal excitation provides an efficient and precise way to excite the cantilever for use in dynamic mode operation of the AFM. The guiding mechanism provides the advantage that the light beam for photothermal excitation of the cantilever can be maintained on the same spot on the cantilever while scanning the probe, which increases the precision of the photothermal excitation.

Optionally, the independent incident light beams may be generated by a single light source instead of independent light sources by using suitable optical elements, such as beam splitters and/or polarizers.

According to a further aspect, the present invention is also directed to an optical guiding mechanism for an atomic force microscope according to the present invention, wherein the optical guiding mechanism comprises at least two optical deflection elements per translational axis configured to compensate the translation of the probe along said axis, said at least two optical deflection elements being arranged to move synchronously with the probe along the respective translational axis, and being configured to define an optical path between the light source and the detector for the incident and reflected light beam in a manner that the optical path length is independent of the translation of the probe along the respective translational axis. According to a further aspect, the present invention is also directed to a method for operating an atomic force microscope according to the present invention, comprising the steps: i) providing the stationary light source and the stationary position sensitive detector on opposite sides with respect to the optical guiding mechanism; ii) providing the at least two optical deflection elements such that an optical path between the light source and the detector for the incident and reflected light beam is defined in a manner that the optical path length is independent of the translation of the probe along the respective axis; iii) scanning the probe along at least one translational axis with which the optical deflection elements move synchronously.

In an embodiment of the method, the optical deflection elements are adjusted to guide incident and reflected light beams in a manner that the incident and reflected light beams are parallel to each other along at least a part of the optical path.

BRIEF DESCRIPTION OF THE DRAWINGS

The present invention will be explained in more detail, by way of example, with reference to the schematic drawings, in which:

FIG. 1c: shows a simplified block diagram of the AFM of FIG. 1a where incident and reflected laser beam have a tilted orientation compared to the configuration shown in FIG. 1a and FIG. 1b;

FIG. 1d: shows a simplified block diagram of the AFM of FIG. 1c in two configurations between which the probe has been translated along the translational axis;

FIG. 3b: shows a schematic perspective view of the scanner of FIG. 3a;

FIG. 4: shows a block diagram of an embodiment of an AFM with optical guiding mechanism;

DETAILED DESCRIPTION

Figure 1A:
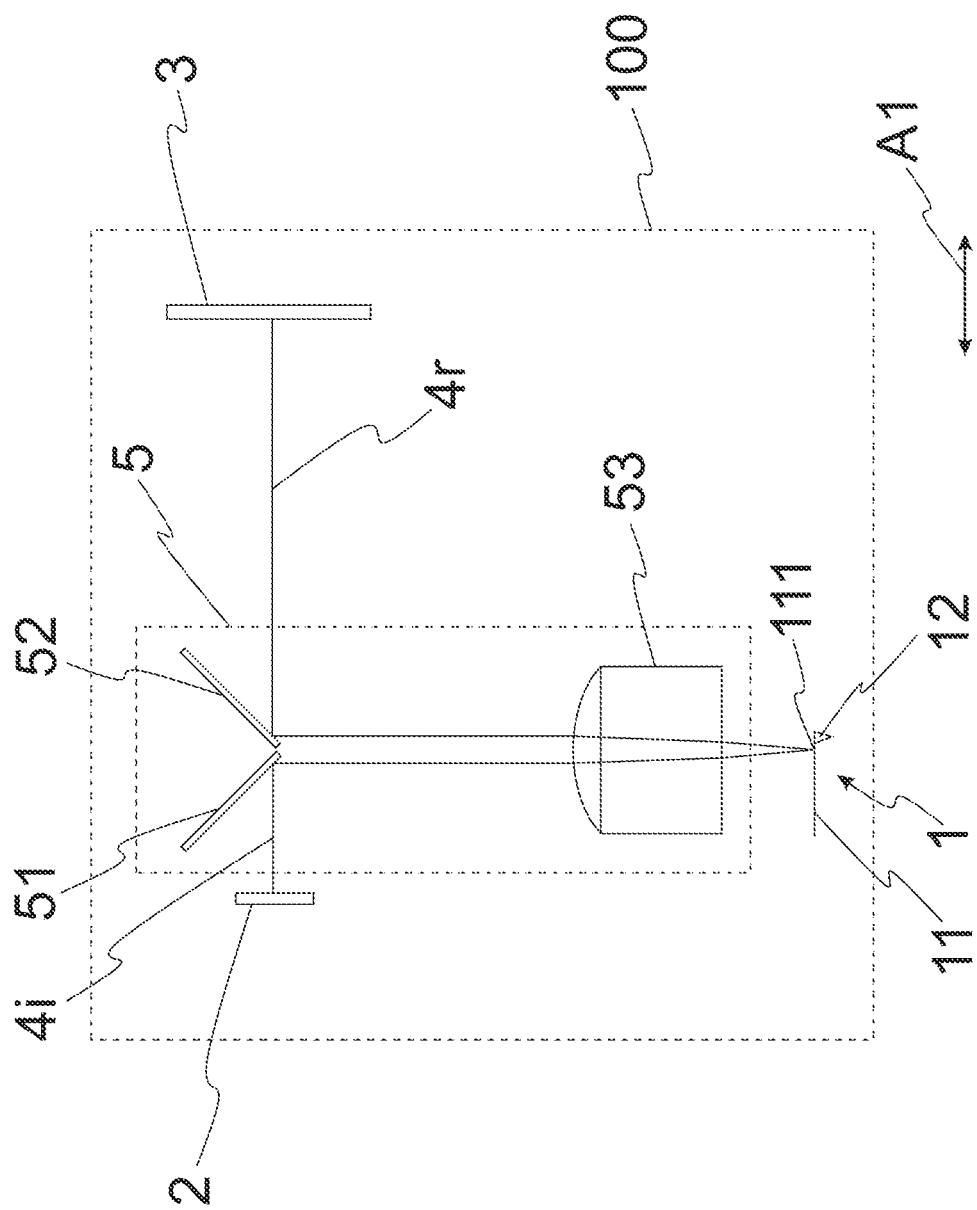
FIG. 1a: shows a simplified block diagram of an embodiment of an AFM with an optical guiding mechanism.

FIG. 1a shows a simplified block diagram of an embodiment of an AFM 100 comprising a probe a with a cantilever 11 and a tip 12. The probe 1 is attached to a scanner (not shown in the diagram) for scanning the probe 1 along the translational axis A1. The probe 1 is shown for simplicity in a horizontal orientation. Appropriate focusing and/or redirecting optics can be used for directing the laser beam onto a desired position on an inclined probe. FIGS. 1a-e show the simplest example of scanning motion compensation along one translational axis A1. The principle shown in FIGS. 1a-e can accordingly be applied to further translational axes. The AFM 100 further comprises a stationary laser source 2 and a stationary PSD 3 which are arranged on opposite sides of the scanner and on opposite sides of an optical guiding mechanism 5. An incident laser beam 4i is generated by the stationary laser source 2 and guided to the probe 1, where the laser beam 4i impinges on a spot 111 of the cantilever 11 and gets reflected. The reflected laser beam 4r is then guided to the stationary PSD 3 where it is detected. Incident laser beam 4i and reflected laser beam 4r are guided by the optical guiding mechanism 5 which comprises a first mirror 51 as a first optical deflection element and a second mirror 52 as a second optical deflection element. The optical guiding mechanism 5 further comprises a focusing optics 53 which focuses the laser beam onto the spot 111 on the cantilever 11. The first mirror 51 deflects the incident laser beam 4i which arrives from the laser source 2 such that the incident laser beam 4i is guided to the focusing optics 53. The second mirror 52 deflects the reflected laser beam 4r which arrives from the cantilever 11 such that the reflected laser beam 4r is guided to the PSD 3. The first and second mirror 51, 52 and the focusing optics 53 are arranged on the scanner in order to move synchronously with the probe 1 along the translational axis A1 while scanning a sample. In FIG. 1a, the incident laser beam 4i before arriving to the first mirror 51, and the reflected laser beam 4r after being deflected by the second mirror 52, are shown to be aligned parallel to the translational axis A1.

Figure 1B:
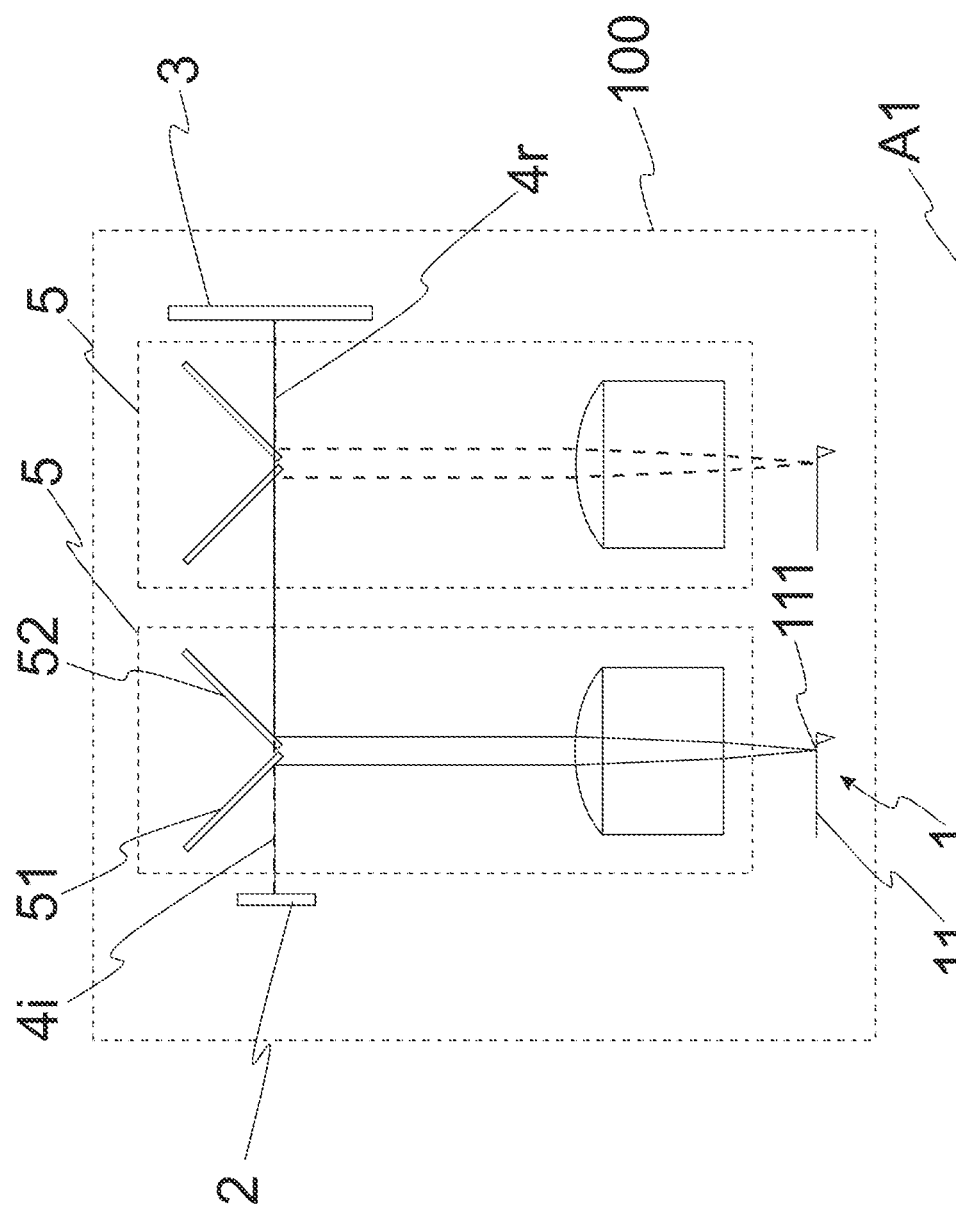
FIG. 1b: shows a simplified block diagram of the AFM of FIG. 1a in two configurations between which the probe has been translated along a translational axis.

FIG. 1b shows a simplified block diagram of the AFM 100 of FIG. 1a in two configurations between which the probe 1 has been translated along the translational axis A1. The optical guiding mechanism 5 is connected to the scanner in such a manner that the optical guiding mechanism 5 is translated in the same direction and by the same amount as the probe 1. Due to the configuration of the first and second mirror 51, 52 of the optical guiding mechanism 5, the incident laser beam 4i impinges on the same spot 111 on the cantilever 11 and reflected laser beam 4r impinges on the same spot on the PSD 3 for both configurations. The optical path for the incident and reflected laser beam 4i, 4r are shown by a continuous line for the first configuration of the AFM 100 and by a dashed line for the second configuration of the AFM 100.

The optical path length for both configurations is independent on the translation of the probe 1 along the translational axis A1.

FIG. 1c shows a simplified block diagram of the AFM 100 of FIG. 1a where the incident laser beam 4i before arriving to the first mirror 51, and the reflected laser beam 4r after being deflected by the second mirror 52, are not parallel to the translational axis A1, but parallel to each other. The deviation of the incident laser beam 4i could arise due to tilting the laser beam from the laser source 2 for positioning the incident laser beam 4i on the spot 111 on the cantilever 11. Compared to the configuration shown in FIG. 1a-1b, it can be recognized that the tilt of the incident laser beam 4i before the first mirror 51 leads to a displacement of the spot where the reflected laser beam 4r impinges on the PSD 3.

FIG. 1d shows a simplified block diagram of the AFM 100 of FIG. 1c in two configurations between which the probe 1 has been translated along the translational axis A1. The optical path for the incident and reflected laser beam 4*i*, 4*r* is shown by a continuous line for the first configuration of the AFM 100 and by a dashed line for the second configuration of the AFM 100. Due to the optical guiding mechanism 5 moving in the same direction and by the same amount as the probe 1 and, in particular, due to the arrangement of the first and second mirror 51, 52, the incident laser beam 4*i* impinges on the same spot 111 on the cantilever 11 and the reflected laser beam 4*r* impinges on the same spot on the PSD 3 for both configurations. The first mirror 51 and the second mirror 52 are configured to define the optical path for the incident and reflected light beam 4*i*, 4*r* such that the optical path length is independent of the translation of the probe 1 along the axis A1, even for the shown configuration where the incident light beam 4*i* before impinging the first mirror 51, and reflected light beam 4*r* after being reflected from second mirror 52 are not parallel to the axis A1. Therefore, the AFM 100 with the optical guiding mechanism 5 provides a scanning motion compensation for translation of the probe 1 along the axis A1.

Figure 1E:
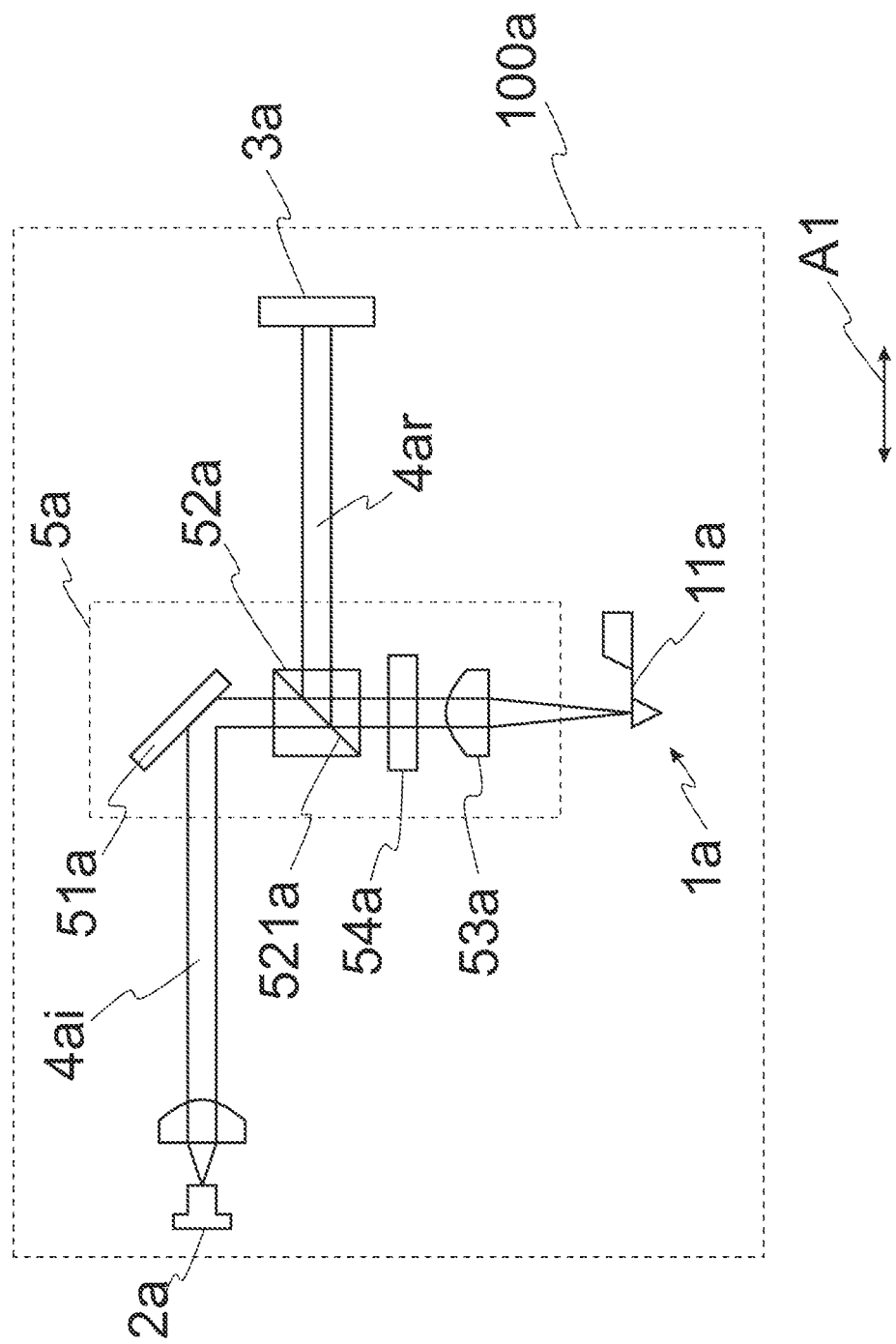
FIG. 1e: shows a simplified block diagram of a further embodiment of an AFM with an optical guiding mechanism.

FIG. 1*e* shows a simplified block diagram of a further embodiment of an AFM 100*a* with an optical guiding mechanism 5*a*. The AFM 100*a* comprises a stationary laser source 2*a* and a stationary PSD 3*a* which are arranged on opposite sides of the scanner and on opposite sides of the optical guiding mechanism 5*a*. The optical guiding mechanism 5*a* comprises a first mirror 51*a* as a first optical deflection element and a polarizing beam splitter 52*a* as a second optical deflection element. The optical guiding mechanism 5*a* further comprises a quarter wave plate 54*a* and a focusing lens 53*a*. The first mirror 51*a* deflects the incident laser beam 4*ai* which arrives from the laser source 2*a*. The deflected incident laser beam passes the polarizing beam splitter 52*a* and the quarter wave plate 54*a*, after which it gets focused onto the cantilever 11*a* by the focusing lens 53*a*. After being reflected from the cantilever 11*a*, the reflected beam 4*ar* passes again the lens 53*a* and the quarter wave plate 54*a*, which rotates the polarization by 90 degrees with respect to the incoming beam, such that the reflected beam 4*ar* gets deflected by the polarizing beam splitter 52*a*. The polarizing beam splitter 52*a* and, in particular, the reflective face 521*a* of the polarizing beam splitter 52*a*, acts only as an optical deflection element in the optical path after the probe 1*a*, since it does not introduce a deflection of the laser beam in the optical path before the probe 1*a*. After being deflected by the polarizing beam splitter 52*a*, the reflected beam 4*ar* impinges on the PSD 3*a*. The embodiment show in FIG. 1*e* has the advantage that incident and reflected laser beams 4*ai*, 4*ar* pass the same region in the center of the focusing lens 53*a*, which reduces false detection due to aberration.

Figure 2A:
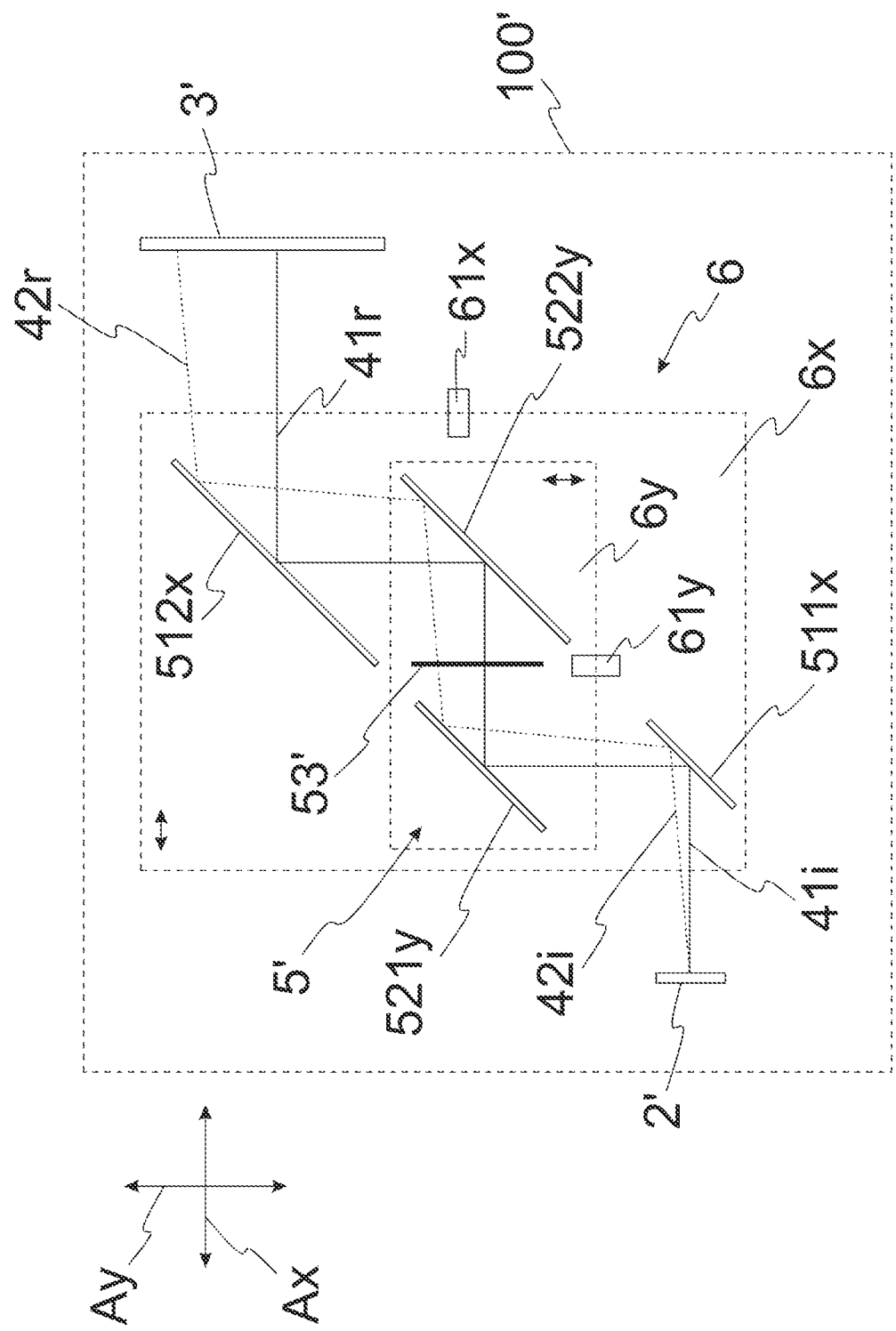
FIG. 2a: shows a simplified block diagram of a further embodiment of an AFM with an optical guiding mechanism.

FIG. 2*a* shows a simplified block diagram of a further embodiment of an AFM 100' with an optical guiding mechanism 5' illustrating a top view on the AFM 100' and, in particular, on a planar flexure-guided scanner 6 of the AFM 100'. The planar flexure-guided scanner 6 comprises a first positioning unit 6*x* for scanning along an X-axis Ax and a second positioning unit 6*y* for scanning along a Y-axis Ay which is nested within the first positioning unit 6*x*. The positioning units 6*x*, 6*y* are movable by means of the piezoelectric actuators 61*x*, 61*y*. The first positioning unit 6*x* and the second positioning unit 6*y* are arranged in a serial-connected fashion, such that the first positioning unit 6*x* is movable along the X-axis Ax with respect to the stationary AFM 100' and the second positioning unit 6*y* is movable along the Y-axis Ay with respect to the first positioning unit 6*x*. With respect to the stationary AFM 100', the positioning unit 6*y* is movable along both the Y-axis Ay and the X-axis Ax. The AFM 100' further comprises a stationary laser source 2' and a stationary PSD 3' which are arranged on opposite sides of the scanner 6.

The optical guiding mechanism 5' comprises four mirrors 511*x*, 512*x*, 521*y*, 522*y* which are movable in the horizontal plane with the probe (not illustrated in the Figure). The two mirrors 511*x*, 512*x* are arranged on the first positioning unit 6*x* to move therewith and the two mirrors 521*y*, 522*y* are arranged on the second positioning unit 6*y* to move therewith. The mirrors 511*x*, 512*x*, 521*y*, 522*y* and the laser source 2' are configured such that the optical paths of incident laser beams 41*i*, 42*i* generated by the stationary laser source 2' and reflected laser beams 41*r*, 42*r* lie in a plane parallel to the plane of the flexure-guided scanner defined by the axes Ax, Ay. The optical paths are shown by a continuous line and a dotted line, respectively. The continuous line shows the optical path of the incident laser beam 41*i* and reflected laser beam 41*r* which exhibit a parallel or perpendicular orientation with respect to the translational axes Ax, Ay, respectively. The dotted line shows the optical path of the incident laser beam 42*i* and reflected laser beam 42*r* which exhibit a tilted orientation with respect to the translational axes Ax, Ay, respectively. A redirecting and focusing optics 53' is arranged on the second positioning unit 6*y* for redirecting the incident laser beam 41*i*, 42*i* out of the plane of the flexure-guided scanner 6 onto the cantilever (i.e. into the page for the illustration in FIG. 2*a*) and the reflected laser beam 41*r*, 42*r* from the cantilever back into the plane of the flexure-guided scanner 6. The mirrors 511*x*, 512*x*, 521*y*, 522*y* and the redirecting and focusing optics 53' are thus arranged such that the laser beam propagates in the following sequence: laser source 2'→first mirror 511*x* on the first positioning unit 6*x*→first mirror 521*y* on the second positioning unit 6*y*→redirecting and focusing optics 53'→cantilever→redirecting and focusing optics 53'→second mirror 522*y* on the second positioning unit 6*y*→second mirror 512*x* on the first positioning unit 6*x*→PSD 3'.

Figure 2B:
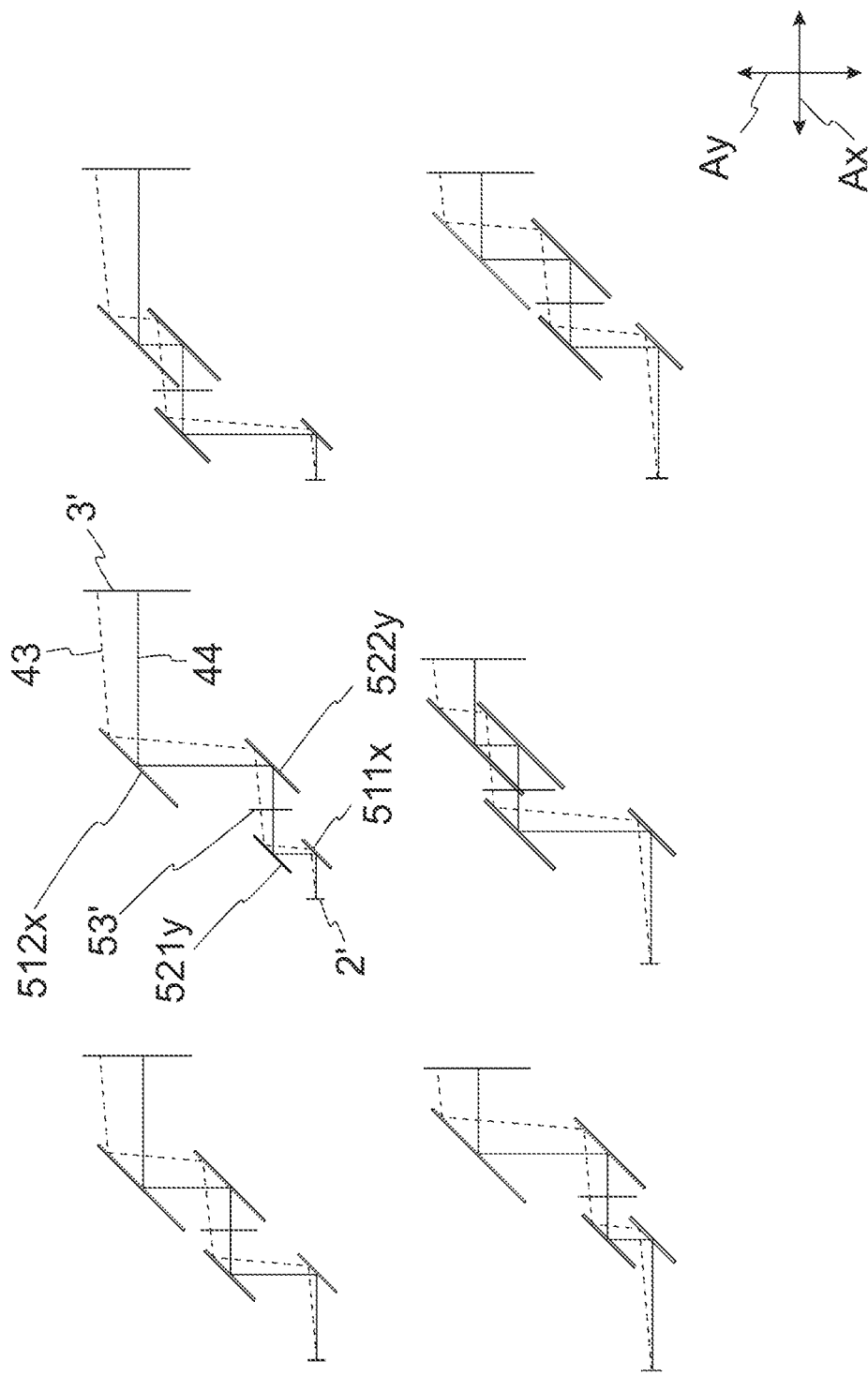
FIG. 2b: shows a simplified block diagram of the guiding mechanism of the AFM of FIG. 2a in six configurations between which the probe has been translated in the horizontal plane of the scanner.

FIG. 2*b* shows a simplified block diagram of the guiding mechanism of the AFM of FIG. 2*a* in six configurations between which the probe has been translated in the horizontal plane of the scanner defined by the axes Ax, Ay. For a better visibility, only selected elements of the guiding mechanism of FIG. 2*a* are shown, in particular, the stationary laser source 2', the stationary PSD 3', the redirecting and focusing optics 53', the first mirror 511*x* and second mirror 512*x* of the first (X-axis) positioning unit, and the first mirror 521*y* and second mirror 522*y* of the second (Y-axis) positioning unit. Further shown are the laser beams 43, 44. For better visibility, the division into incident and reflected laser beams has been omitted and only the elements of the block diagram of one of the six configurations has been furnished with reference numerals. The laser beam 44 with an orientation parallel or perpendicular to the axes Ax, Ay, respectively, is illustrated by a continuous line. The laser beam 43 with a tilted orientation with respect to the axes Ax, Ay, respectively, is illustrated by a dashed line. The optical path length for both laser beams 43, 44 is independent on the translation of the probe of the AFM. The translation of the probe of the AFM can be recognized by the translation of the redirecting and focusing optics 53'. The laser beams 43, 44 impinge on the same spot on the cantilever and on the same spot on the stationary PSD for all six configurations. Thus scanning motion in the horizontal plane is compensated by the AFM with the optical guiding mechanism.

Figure 3A:
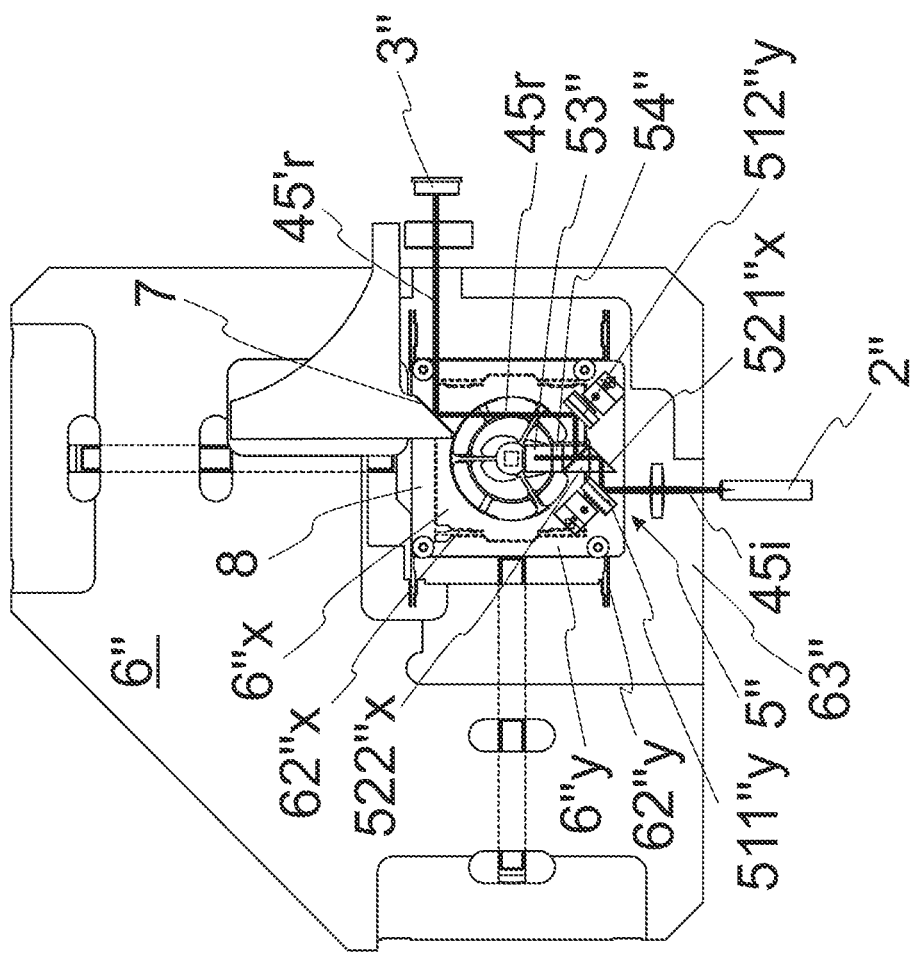
FIG. 3a: shows a schematic perspective top view of a scanner of an embodiment of an AFM with optical guiding mechanism.

FIG. 3a shows a schematic top view of a planar flexure-guided scanner 6" of an embodiment of an AFM with optical guiding mechanism 5". The AFM comprises a stationary laser source 2" and a PSD 3". The planar flexure-guided scanner 6" comprises a stationary support 63" and first and second positioning units 6"y and 6"x for scanning along a y-axis and an x-axis, respectively. The first positioning unit 6"y is connected to the support 63" by flexures 62"y. The second positioning unit 6"x is nested within the first positioning unit 6"y and connected thereto by flexures 62"x in a serial-connected fashion. A first mirror 511"y and a second mirror 512"y are mounted on a mounting plate 8, which is mounted on the first positioning unit 6"y to move therewith. Due to the mounting plate 8, the second positioning unit 6"x and its flexures 62"x arranged below the mounting plate 8, are illustrated by dashed lines. Optics comprising a prism 521"x and a polarizing beam splitter 522"x are mounted on the second positioning unit 6"x to move therewith. On the second positioning unit 6"x, there is further mounted a quarter wave plate 54" and a redirecting prism 53", which redirects an incident laser beam 45i to a probe with a cantilever arranged below the scanner 6", and a reflected laser beam 45r from the probe back into the plane of the scanner 6". The incident laser beam 45i from the laser source 2" is substantially parallel to the y-axis and impinges on the first mirror 511"y and gets deflected substantially parallel to the x-axis, in order to impinge on the prism 521"x. The prism 521"x deflects the incident laser beam 45i to pass the polarizing beam splitter 522"x and the quarter wave plate 54" and to reach the redirecting prism 53". From the redirecting prism 53", the incident laser beam 45i impinges a spot on the cantilever, and gets reflected therefrom. The reflected laser beam 45r gets redirected by the redirecting prism 53" back into the plane of the scanner 6", where it passes through the quarter wave plate 54", rotating the polarization by 90 degrees with respect to the incoming beam and gets deflected by the polarizing beam splitter 522"x substantially parallel to the x-axis. From the polarizing beam splitter 522"x, the reflected laser beam 45r impinges on the second mirror 512"y which deflects the reflected laser beam 45r in a direction substantially parallel to the y-axis. The scanner 6" comprises an additional stationary mirror 7, which is connected to the support 63" and which deflects the reflected laser beam 45r by another 90°, such that the reflected laser beam 45'r is oriented substantially parallel to the x-axis. The reflected laser beam 45'r finally reaches the PSD 3". FIG. 3 is an example where the stationary light source and the stationary PSD are not arranged on opposite sides of the scanner due to the additional stationary mirror 7. However, the incident laser beam 45i and the reflected laser beam 45r enter (before the first mirror 511"y) and leave (after the second mirror 512"y) the optical guiding mechanism 5" on opposite sides, respectively. The optical path length of the incident laser beam 45i and the reflected laser beam 45r is independent of the motion of the probe in the plane of the scanner 6", such that a scanning motion compensation of the scanner 6" is provided.

Figure 3B:
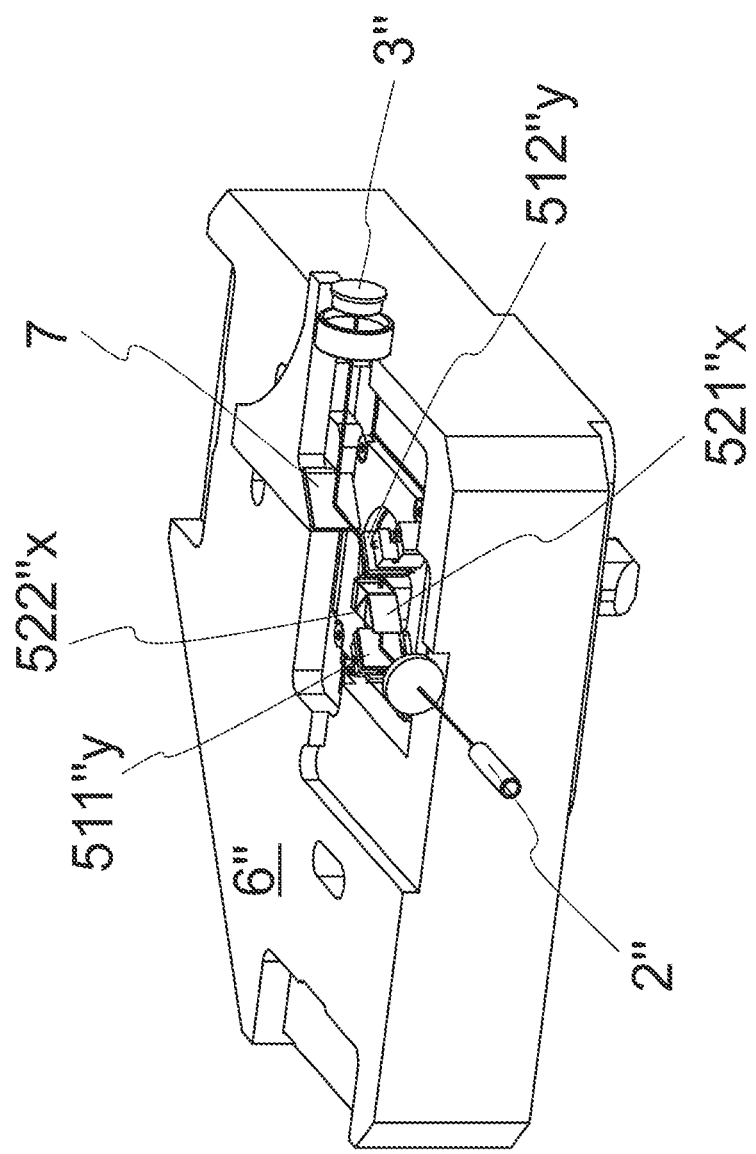

FIG. 3b shows a schematic perspective view of the scanner 6" of FIG. 3a. Components shown in FIG. 3a are denoted with corresponding reference numerals, in particular first mirror 511"y, second mirror 512"y, prism 521"x, polarizing beam splitter 522"x and additional stationary mirror 7.

FIG. 4 shows a block diagram of an embodiment of an AFM 100''' with optical guiding mechanism 5'''. The AFM 100''' exhibits substantially the same configuration as the embodiment shown in FIG. 3, except that the AFM 100''' comprises two stationary laser sources 21''', 22'''. The first laser source 21''' is a readout laser and is used as described in the embodiments of FIGS. 1-3, in order to detect deflections of the cantilever 11'''. The second laser source 22''' is a photothermal laser source and is used for photothermal excitation of the cantilever 11''' in dynamic mode of the AFM 100'''. The probe of the AFM 100''' comprises the cantilever 11''' and a tip 12''' arranged at a free end of the cantilever 11'''. The optical guiding mechanism 5''' ensures that the laser beam generated by the photothermal laser impinges on a spot 111'''b on the cantilever 11''' in order to provide a precise excitation of the cantilever 11'''. The incident laser beams 461i, 462i from the readout laser source 21''' and the photothermal laser source 22''', respectively, pass/are reflected by a dichroic mirror 10, such that both incident laser beams 461i, 462i can enter the optical guiding mechanism 5'''. The AFM 100''' comprises a scanner 6''' with flexure-guided first and second positioning units 6'''y, 6'''x for horizontal scanning. The scanner 6''' further comprises a vertical positioning unit 6'''z for vertical motion. The positioning units 6'''y, 6'''x, 6'''z are arranged in a serial-connected fashion. A cantilever 11''' and a tip 12''' are mounted on the vertical positioning unit 6'''z.

A first mirror 511'''y and a second mirror 512'''y are mounted on the first positioning unit 6'''y to move therewith. A prism 521'''x and a polarizing beam splitter 522'''x are mounted on the second positioning unit 6'''x to move therewith. A quarter wave plate 54''' is arranged between the polarizing beam splitter 522'''x and a redirecting prism 531'''. After the redirecting prism 531''', a focusing lens 532''' is arranged on the vertical positioning unit 6'''z in order to focus the readout laser beam and the excitation laser beam to two different spots 111'''a, 111'''b on the cantilever, respectively. The incident laser beam 46i, after being deflected by the first mirror 511'''y and the prism 521'''x, passes the polarizing beam splitter 522'''x. Due to the phase shift introduced by the quarter wave plate 54''' and the reflection off the cantilever 11''', the reflected laser beam 46r is deflected by the beam splitter 522'''x and guided to the second mirror 512'''y. The second mirror 512'''y deflects the reflected laser beam 46r in order to be guided to the PSD 3'''. A bandpass optical filter 9 arranged before the PSD 3''' ensures that only the component of the readout laser impinges on the PSD 3'''.

Figure 5:
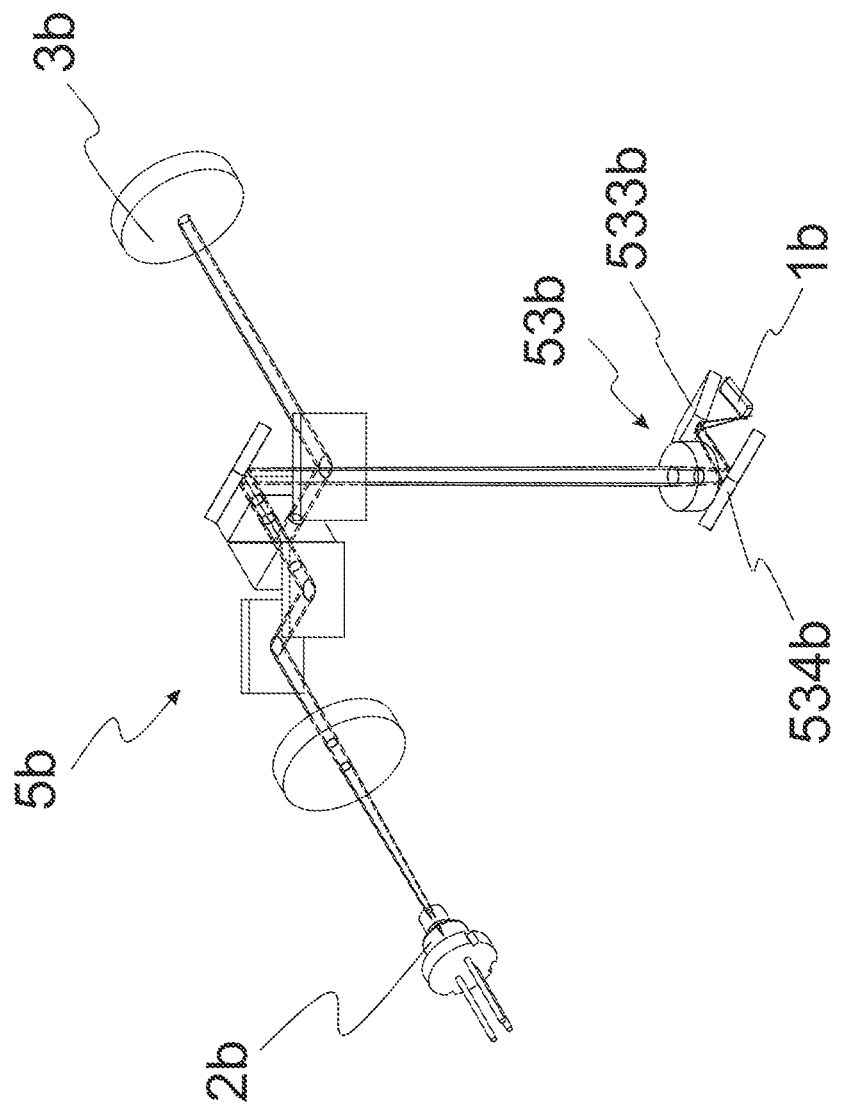
FIG. 5 shows a schematic perspective view of a further embodiment of an optical guiding mechanism.

FIG. 5 shows a schematic perspective view of an optical guiding mechanism 5b. A stationary light source 2b and a stationary PSD 3b are shown in addition. The Figure shows a focusing and redirecting optics 53b with mirrors 533b, 534b which focus the light beam on the cantilever of an inclined probe 1b.

LIST OF REFERENCE NUMERALS

AFM 100, 100a, 100', 100'''
Probe 1, 1a, 1b
Cantilever 11, 11a, 11'''
Tip 12, 12'''
Stationary light source 2, 2a, 2b, 2', 2", 21''', 22'''
PSD 3, 3a, 3b, 3', 3", 3'''
Laser beam 43, 44
Incident laser beam 4i, 4ai, 41i, 42i, 45i, 46i, 461i, 462i
Reflected laser beam 4r, 4ar, 41r, 42r, 45r, 45'r, 46r
Optical guiding mechanism 5, 5a, 5b, 5', 5", 5'''
First mirror 51, 51a, 511x, 521y, 511"y, 511'''y
Second mirror 52, 512x, 522y, 512"y, 512'''y
Prism 521"x, 53", 521'''x, 531'''

Polarizing beam splitter 52a, 522"x, 522'"x
Reflective face 521a
Focusing/Redirecting optics 53, 53a, 53b, 533b, 534b, 53', 53", 532'
Quarter wave plate 54a, 54", 54'"
Scanner 6, 6", 6'"
First positioning unit 6x, 6"y, 6'"y
Second positioning unit 6y, 6"x, 6'"x
Vertical positioning unit 6'"z
Flexures 62"x, 62"y
Support 63"
Stationary mirror 7
Mounting plate 8
Bandpass optical filter 9
Dichroic mirror 10
Translational axis A1, Ax, Ay, x, y

The invention claimed is:

1. An atomic force microscope for scanning a probe comprising a cantilever over a surface, the atomic force microscope comprising:
 a scanner for scanning the probe along at least one translational axis,
 a stationary light source for generating an incident light beam,
 a stationary position sensitive detector for detecting a light beam reflected from the cantilever,
 an optical guiding mechanism for compensating a scanning motion of the probe and configured to guide the incident light beam to a spot on the cantilever and to guide the reflected light beam from the cantilever to the position sensitive detector,
 wherein the optical guiding mechanism comprises at least two optical deflection elements per translational axis being arranged to move synchronously with the probe along the respective translational axis, and being configured to define an optical path between the light source and the detector for the incident and reflected light beam in a manner that the optical path length is independent of the translation of the probe along the respective translational axis, and
 wherein the scanner comprises a planar flexure-guided positioner for scanning the probe.

2. The atomic force microscope according to claim 1, wherein the at least two optical deflection elements per translational axis comprise a first optical deflection element arranged in the optical path of the light beam before impinging on the cantilever and a second optical deflection element arranged in the optical path of the light beam after being reflected from the cantilever.

3. The atomic force microscope according to claim 1, wherein the stationary light source and the stationary position sensitive detector are arranged on opposite sides with respect to the optical guiding mechanism.

4. The atomic force microscope according to claim 1, wherein the at least two optical deflection elements are configured to guide incident and reflected light beams such that the incident and reflected light beams are parallel to each other along at least a part of the optical path.

5. The atomic force microscope according to claim 1, wherein the scanner is configured to scan the probe along a first and a second horizontal translational axis, and wherein the optical guiding mechanism comprises at least four optical deflection elements, wherein for each of the first and second horizontal translational axis at least two optical deflection elements are arranged to move synchronously with the probe along the respective axis.

6. The atomic force microscope according to claim 5, wherein the at least two optical deflection elements associated with the first horizontal translational axis and the at least two optical deflection elements associated with the second horizontal translational axis are arranged in a nested manner.

7. The atomic force microscope according to claim 1, wherein the scanner is configured to scan the probe along a vertical axis, and wherein the optical guiding mechanism comprises at least two optical deflection elements which are arranged to move synchronously with the probe along said vertical axis.

8. The atomic force microscope according to claim 1, wherein the optical deflection elements for compensating the translation of the probe are configured to guide the light beam to propagate in a plane parallel to a plane of the scanner along at least a part of the optical path.

9. The atomic force microscope according to claim 1, wherein the planar flexure-guided scanner comprises a first positioning unit for scanning along an X-axis and a second positioning unit for scanning along a Y-axis perpendicular to the X-axis, wherein the positioning units are serially connected.

10. The atomic force microscope according to claim 1, wherein the atomic force microscope comprises at least two independent stationary light sources for generating at least two independent incident light beams, wherein the optical guiding mechanism is configured to guide each incident light beam to a spot on the cantilever, wherein the optical deflection elements of the optical guiding mechanism are configured to define an optical path for each incident and reflected light beam between the light source and the detector in a manner that each optical path length is independent of the translation of the probe along the respective translational axis.

11. The atomic force microscope according to claim 10, wherein one of the independent stationary light sources is a photothermal laser source for photothermal excitation of the cantilever.

12. An optical guiding mechanism for an atomic force microscope according to claim 1, wherein the optical guiding mechanism comprises at least two optical deflection elements per translational axis configured to compensate the translation of the probe along said axis, said at least two optical deflection elements being arranged to move synchronously with the probe along the respective translational axis, and being configured to define an optical path between the light source and the detector for the incident and reflected light beam in a manner that the optical path length is independent of the translation of the probe along the respective translational axis.

13. A method for operating an atomic force microscope according to claim 1, comprising the steps: i) providing the stationary light source and the stationary position sensitive detector on opposite sides with respect to the optical guiding mechanism; ii) providing the at least two optical deflection elements such that an optical path between the light source and the detector for the incident and reflected light beam is defined in a manner that the optical path length is independent of the translation of the probe along the respective axis; iii) scanning the probe along at least one translational axis with which the optical deflection elements move synchronously.

14. The method according to claim 13, wherein the optical deflection elements are adjusted to guide incident and reflected light beams in a manner that the incident and reflected light beams are parallel to each other along at least a part of the optical path.

15. An atomic force microscope for scanning a probe comprising a cantilever over a surface, the atomic force microscope comprising:
- a scanner for scanning the probe along at least one translational axis,
- a stationary light source for generating an incident light beam,
- a stationary position sensitive detector for detecting a light beam reflected from the cantilever,
- an optical guiding mechanism for compensating a scanning motion of the probe and configured to guide the incident light beam to a spot on the cantilever and to guide the reflected light beam from the cantilever to the position sensitive detector,
- wherein the optical guiding mechanism comprises at least two optical deflection elements per translational axis being arranged to move synchronously with the probe along the respective translational axis, and being configured to define an optical path between the light source and the detector for the incident and reflected light beam in a manner that the optical path length is independent of the translation of the probe along the respective translational axis,
- wherein the scanner is configured to scan the probe along a first and a second horizontal translational axis, and
- wherein the optical guiding mechanism comprises at least four optical deflection elements, wherein for each of the first and second horizontal translational axis, at least two optical deflection elements are arranged to move synchronously with the probe along the respective axis.

16. The atomic force microscope according to claim 15, wherein the at least two optical deflection elements associated with the first horizontal translational axis and the at least two optical deflection elements associated with the second horizontal translational axis are arranged in a nested manner.

17. An atomic force microscope for scanning a probe comprising a cantilever over a surface, the atomic force microscope comprising:
- a scanner for scanning the probe along at least one translational axis,
- a stationary light source for generating an incident light beam,
- a stationary position sensitive detector for detecting a light beam reflected from the cantilever,
- an optical guiding mechanism for compensating a scanning motion of the probe and configured to guide the incident light beam to a spot on the cantilever and to guide the reflected light beam from the cantilever to the position sensitive detector,
- wherein the optical guiding mechanism comprises at least two optical deflection elements per translational axis being arranged to move synchronously with the probe along the respective translational axis, and being configured to define an optical path between the light source and the detector for the incident and reflected light beam in a manner that the optical path length is independent of the translation of the probe along the respective translational axis,
- wherein the scanner is configured to scan the probe along a vertical axis, and wherein the optical guiding mechanism comprises at least two optical deflection elements which are arranged to move synchronously with the probe along said vertical axis.

* * * * *